(12) United States Patent
DeBoynton

(10) Patent No.: US 6,321,022 B1
(45) Date of Patent: Nov. 20, 2001

(54) THERMALLY COMPENSATED VARIABLE OPTICAL ATTENUATOR WITH DISPLACEMENT MECHANISM

(75) Inventor: William L. DeBoynton, Santa Ana, CA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/713,700

(22) Filed: Nov. 15, 2000

Related U.S. Application Data

(60) Provisional application No. 60/173,854, filed on Dec. 30, 1999.

(51) Int. Cl.[7] .................................................. G02B 6/00
(52) U.S. Cl. .............................. 385/140; 385/31; 385/37; 385/43; 385/48
(58) Field of Search ............................... 385/140, 43, 48, 385/31, 32, 19, 24, 92, 99, 37

(56) References Cited

U.S. PATENT DOCUMENTS

| | | | |
|---|---|---|---|
| 5,146,519 | 9/1992 | Miller et al. | 385/43 |
| 5,333,217 * | 7/1994 | Kossat | 385/32 |
| 5,353,363 | 10/1994 | Keck et al. | 385/46 |
| 5,594,820 | 1/1997 | Garel-Jones et al. | 385/22 |
| 6,173,106 * | 1/2001 | DeBoynton et al. | 385/140 |
| 6,181,851 * | 6/2001 | Pan et al. | 385/37 |

* cited by examiner

Primary Examiner—Hemang Sanghavi
(74) Attorney, Agent, or Firm—Eugene Stephens & Associates; Thomas B. Ryan

(57) ABSTRACT

A variable optical amplifier mounts a fiber coupler within a flexure that provides for deflecting one section of the coupler with respect to another about a tapered intermediate section for controlling transmissions through the coupler. The flexure has a free portion suspended by a pair of resilient arms for relatively deflecting the coupler sections while minimizing friction and maintaining a fixed angular orientation with an actuator. A kinematic link between the flexure and the actuator is thermally compensated not only at a given deflection position but throughout the entire intended range of operation.

56 Claims, 4 Drawing Sheets

THERMALLY COMPENSATED VARIABLE OPTICAL ATTENUATOR WITH DISPLACEMENT MECHANISM

This application claims the benefit of U.S. Provisional Application No. 60/173,854, filed on Dec. 30, 1999, which provisional application is incorporated by reference herein.

TECHNICAL FIELD

Mechanical actuation, preferably under servo-control, adjusts optical signal attenuation over a continuum. Consistent performance requires attention to friction reduction and thermal compensation.

BACKGROUND OF THE INVENTION

Variable optical attenuators (VOAs) are key components of optical networks, including local and long distance telephone networks. High performance telecommunication systems of the future are expected to rely on VOAs to perform a variety of functions such as filtering, switching, splitting, coupling, and combining as well as to participate in other functions such as multiplexing and demultiplexing.

Optical signal attenuation can be accomplished in a variety of ways through diverting all or a portion of an optical signal from an original pathway. The diverted optical signal can be discarded for performing such operations as in filtering or can be transferred to one or more additional pathways for performing such operations as switching, splitting, and coupling. In addition, optical signals traveling in different original pathways can be diverted in whole or in part into a common pathway, such as in combining operations.

The "variable" capability of VOAs distinguishes them from simpler discrete state devices, such as on-off switches, that direct all or none of the optical signal to selected pathways. A range of operating positions within VOAs provides a further capability to distribute or collect optical signals in different proportions among pathways.

U.S. Pat. No. 5,146,519 to Miller et al. and U.S. Pat. No. 5,353,363 to Keck et al. disclose VOAs using fiber couplers to provide the variable attenuating function. The fiber couplers include one or more fibers within an overcladding that are drawn down to a reduced diameter at a midsection. Bending or twisting about the midsection of the coupler changes the optical characteristics (e.g., propagation constant) of the coupler to progressively couple or uncouple light between adjacent fibers or change modes of transmission within a single fiber.

Correlating a desired amount of attenuation with a command signal presents difficult mechanical challenges because of a high sensitivity of the fiber couplers to bending. In addition, friction and backlash among moving elements of a bending actuator and thermal size variations of the actuator and fused coupler mountings undermine repeatability.

SUMMARY OF INVENTION

A variable optical attenuator (VOA) in accordance with one or more embodiments of this invention includes an electro-mechanical actuator that provides precise repeatable control over an optical attenuator to closely correlate a desired amount of optical attenuation with a command signal. The actuator maintains precise alignments, eliminates backlash, reduces friction, and compensates for thermal expansion and contraction characteristics among its components.

One such embodiment includes a frame and a fiber optical coupler having first and second fiber sections joined by an intermediate fiber section. A flexure has a fixed portion mounted on the frame and a free portion suspended from a resilient portion out of frictional engagement with the frame. The first fiber section of the optical coupler is attached to the frame. The second fiber section of the optical coupler is supported for limited angular movement by the free portion of the flexure.

A kinematic chain of an actuator connects a source of motion to the free portion of the flexure for displacing the free portion of the flexure with respect to the fixed portion of the flexure. The free portion of the flexure is displaceable with respect to the fixed portion of the flexure without substantially changing in angular orientation. A bearing carried by the free portion of the flexure permits angular movement of the second fiber section with respect to the free portion of the flexure. The intermediate section of the optical coupler bends in response to the displacement of the free portion of the flexure to adjust transmission characteristics of the optical coupler.

The coupler is preferably a fused optical coupler in which the intermediate portion tapers to a reduced diameter. The flexure preferably takes the form of a parallelogram with the resilient portion formed by two resilient arms extending between the fixed and free portions of the flexure. The resilient arms, which extend nearly parallel, perform several important functions. For example, the resilient arms exhibit flexibility in a first orthogonal direction and rigidity in a second orthogonal direction for supporting the free portion of the flexure from the frame. The resilient arms permit the free portion of the flexure to be displaced by the kinematic chain while remaining angularly aligned with the kinematic chain. In addition, the resilient arms preload the kinematic chain to avoid backlash.

A sleeve preferably surrounds the second fiber section of the optical coupler and supports the bearing that allows angular movement of the second fiber section with respect to the free portion of the flexure. The bearing, which is preferably spherical, is preferably received in a cylindrical surface of the free portion of the flexure to permit both angular and axial movements of the second fiber section. The permitted angular movement allows smooth bending of the intermediate section of the fiber coupler accompanying displacement of the second section of the coupler. The permitted axial movement of the second fiber section accommodates changes in position between the relatively displaced fixed and free sections of the flexure.

Another embodiment of the variable optical attenuator features improvements in thermal compensation. A frame supports an optical attenuator having first and second relatively displaceable sections for attenuating the optical signals as a function of their relative displacement. The first section of the attenuator is attached to the frame. The second section of the attenuator is supported for movement with respect to the frame. A source of motion is also attached to the frame. A kinematic chain connects the source of motion to the second section of the attenuator for displacing the second section with respect to the first section of the attenuator through a range of relative displacement positions.

The first section of the attenuator is spaced from the source of motion through a first distance that varies as a function of temperature. The second section of the attenuator is spaced from the source of motion through a second distance that varies as a function of both temperature and the relative displacement. Portions of the second distance contributed by the relative displacement, however, do not significantly vary as a function of temperature. Throughout the range of displacement positions, the distances between the first and second sections of the attenuator and the source of motion vary by substantially the same amounts as a function of temperature so that the relative displacement positions remain substantially independent of temperature.

The kinematic chain preferably includes among a series of components a cam having a dimension that varies as a function of position. A first portion of the cam including the variation in dimension is made of a material (e.g., Invar) having a lower coefficient of thermal expansion than the materials (e.g., aluminum) of the other components of the kinematic chain. A remaining portion of the cam can also made of the same material.

Any change in the thermal expansion characteristics of the remaining portion of the cam can affect the relative thermal expansion characteristics between the first and second distances. A reduced thermal expansion of the remaining cam portion can be offset by a corresponding increase in the thermal expansion characteristics of one or more components along the first distance or by a corresponding decrease in the thermal expansion characteristics of one or more components along the second distance.

DRAWINGS

DETAILED DESCRIPTION

Figure 1:
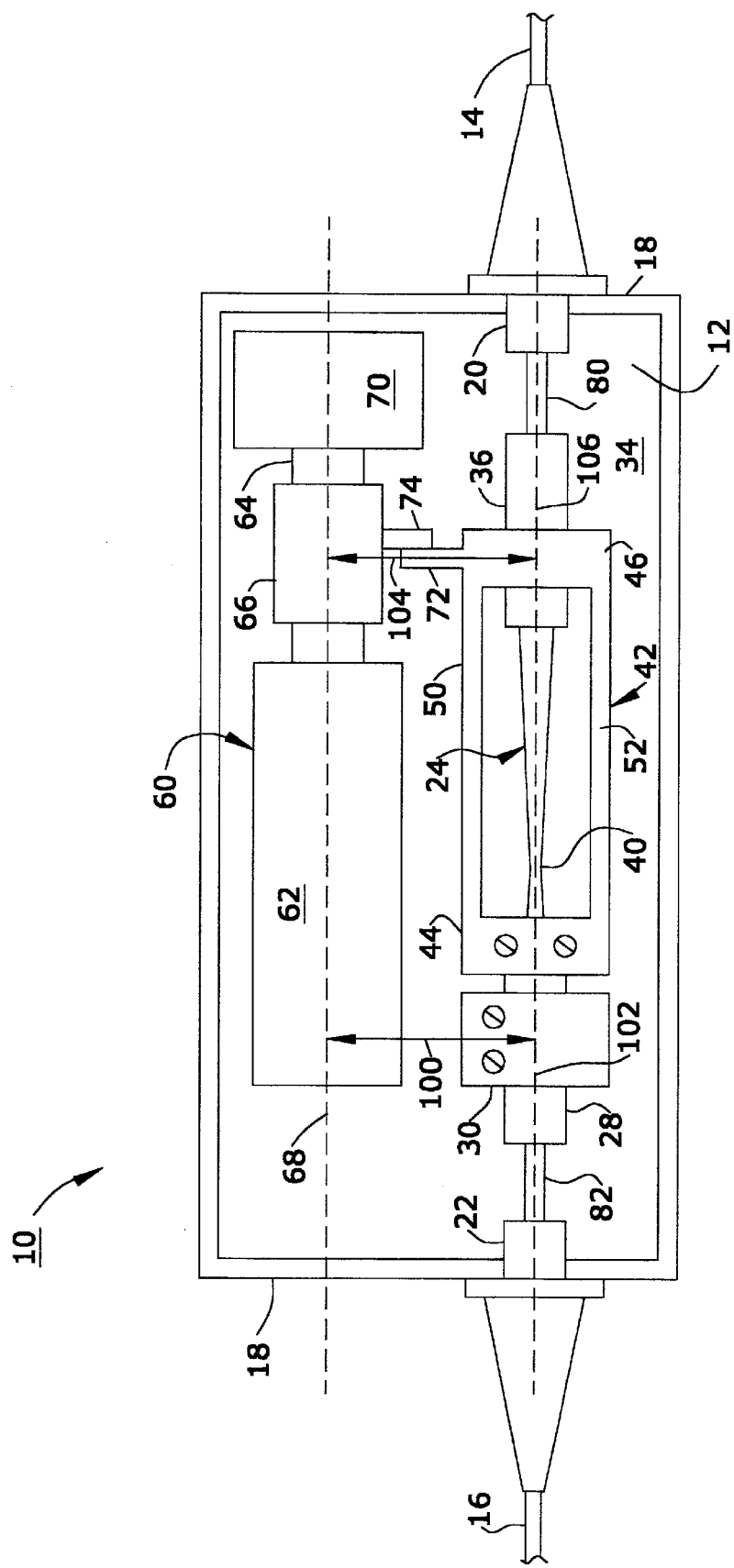
FIG. 1 is a schematic plan view of a variable optical attenuator in a first position of minimum deflection.
Figure 2:
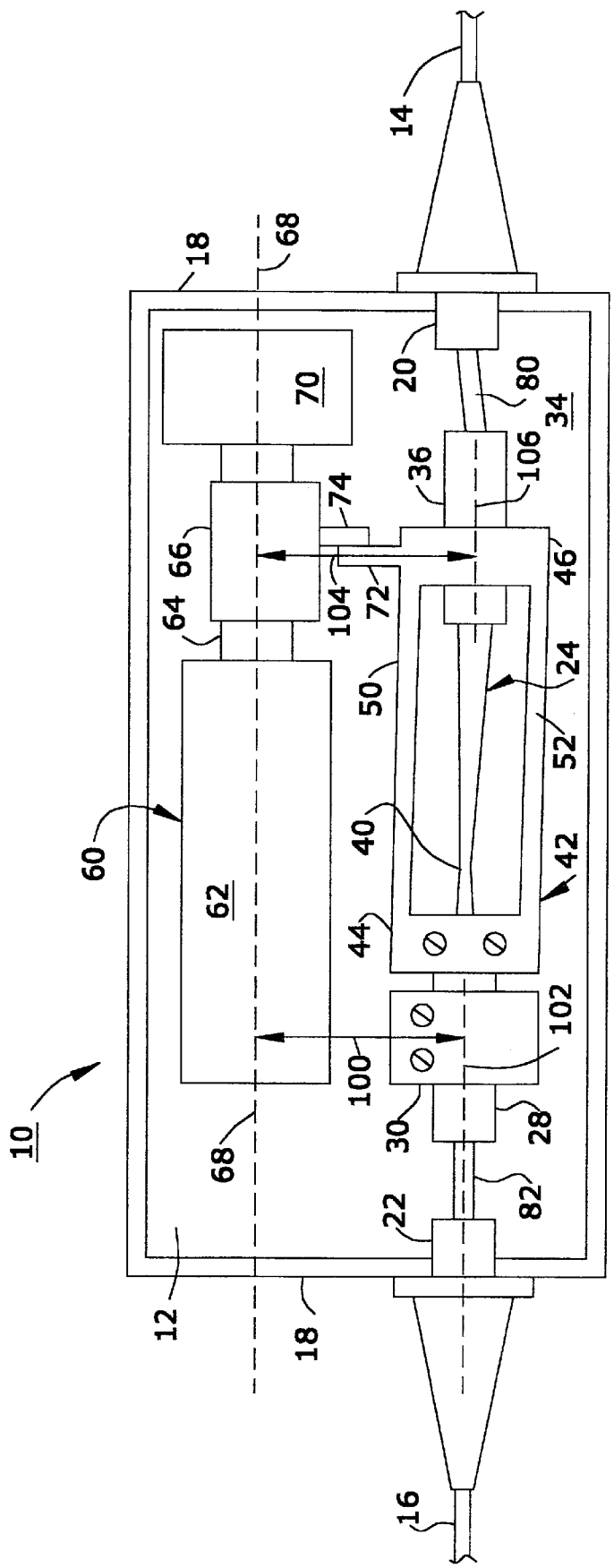
FIG. 2 is a schematic plan view of a variable optical attenuator in a second position of maximum deflection.
Figure 3:
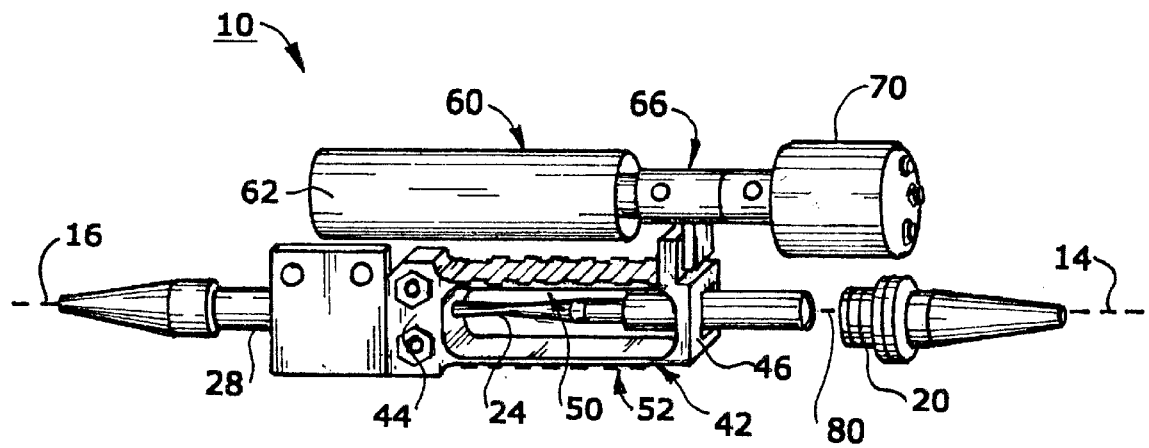
FIG. 3 is a more realistic perspective view of the variable optical attenuator with an underlying frame removed to better show active components.

An exemplary variable optical amplifier (VOA) 10 of this invention is variously shown in FIGS. 1–3. The VOA 10 is assembled on a frame 12, which is preferably made of aluminum or an aluminum alloy (e.g., 6061). Input and output optical fibers (or fiber bundles) 14 and 16 enter and exit side walls 18 of the frame 12 through thermal and stress compensating devices 20 and 22.

Figure 4:
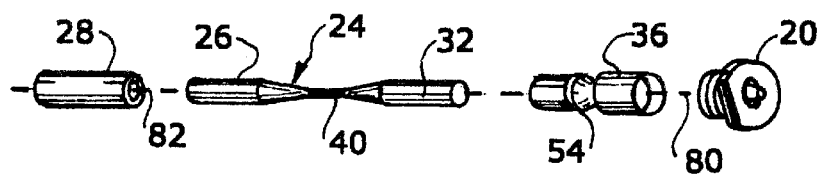
FIG. 4 is an exploded view of fiber coupler and its immediate supports within the attenuator.
Figure 5:
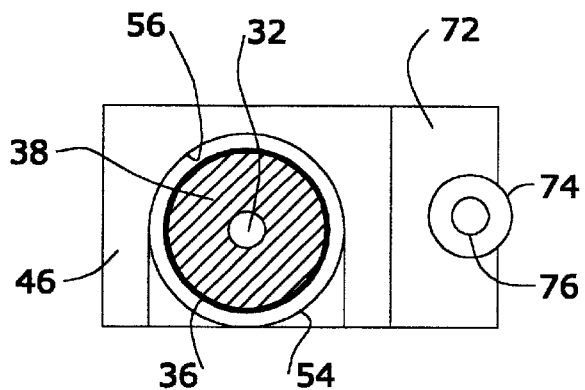
FIG. 5 is an end view of the coupler mounting within a free end of a flexure device for imparting bending.

Within the frame 12, a fused bi-conical silica glass coupler 24 joins the input and output optical fibers 14 and 16. A first section 26 of the fused coupler 24 (see FIG. 4) is fixed to the frame 12 through a low modulus material bushing 28 and a clamp block 30. The bushing 28 is preferably made of a RTV silicone material that provides a stress reducing buffer against mechanical shock. A second section 32 of the fused coupler 24 is movable with respect to the frame 12 in a plane of motion 34 corresponding to the drawing plane of FIGS. 1 and 2. A sleeve 36, which includes an internal bushing 38 (see FIG. 5), encircles the second section 32 of the fused coupler 24. An intermediate section 40 of the fused coupler 24 tapers to a reduced diameter that can be bent for influencing optical transmission characteristics through the fused coupler 24.

The fused coupler 24 threads through a two-arm flexure 42 having a fixed portion 44 secured to the frame 12 and a free portion 46 that is suspended from the fixed portion 44 by a pair of resilient arms 50 and 52. The first section 26 of the coupler 24 passes unimpeded through the fixed portion 44 of the flexure 42, but the second section 32 of the coupler 24 is supported through a spherical bearing 54 (see FIGS. 4 and 5) within the free portion 46 of the flexure 42. The spherical bearing 54 is formed on an outer surface of the sleeve 36. A cylindrical slide 56 within the free portion 46 of the flexure 42 allows the sleeve 36 and the second section 32 of the coupler 24 to pivot on the spherical bearing 54 and to translate along the cylindrical slide 56 in a generally axial direction of the coupler 24.

The resilient arms 50 and 52 extend generally parallel to each other to support a deflection of the free portion 46 of the flexure with respect to the fixed portion 44 of the flexure in the plane of motion 34 while substantially maintaining a fixed angular orientation of the flexure's free portion 46 in the same plane 34. However, the resilient arms have a larger dimension in a direction extending normal to the plane of motion 34 than in the plane of motion 34 to constrain movement of the free portion 46 away from the frame 12. Rectangular cross-sectional shapes of the resilient arms 50 and 52 are preferred for these purposes, but other continuous or discontinuous shapes and assemblages are also possible. Some slight convergence of the resilient arms 50 and 52 can be used to compensate for stretching and compressing of the arms 50 and 52 under load.

An actuator 60 for deflecting the free portion 46 of the flexure 42 begins with a micro-step motor 62 (such as is available from Arsape in Switzerland) mounted on the frame 12. A drive shaft 64 of the motor 62 rotates an eccentrically mounted cam 66 about a rotational axis 68 and engages a potentiometer 70 that monitors rotational position of the drive shaft 64. A motor controller (not shown) regulates electrical current to the motor 62 to accomplish desired rotational positions of the cam 66 based on feedback provided by the potentiometer 70.

The cam 66 can have a simple cylindrical shape that is eccentrically mounted on the axis 68 or can have an irregular shape that also varies in radius around the axis 68. An extension 72 of the free portion 46 of the flexure 42 supports a rotational bearing 74 from a pin 76 (see FIG. 5). The bearing 74 engages the cam 66 in rolling contact so that rotational motion of the cam 66 is converted into a translational motion of the flexure's free portion 46 with a minimum of friction.

FIGS. 1 and 2 depict undeflected and deflected positions of the flexure 42 corresponding to two different rotational positions of the cam 66. The second section 32 of the coupler 24 is displaced together with the free portion 46 of the flexure 42 with respect to the first section 26 of the coupler 24, producing a bend in the intermediate section 40 of the coupler 24 that varies in angle with the amount of coupler deflection. The spherical bearing 54 within the free portion of the coupler 42 permits the relative angular movement between the first and second sections 26 and 32 of the coupler 24 to concentrate the bending moment within the intermediate section 40 of the coupler 24. However, the free portion 46 of the flexure 42 maintains a substantially constant angular orientation with respect to the motor drive shaft 64 so that the engagement between the cam 66 and the bearing 74 is not subject to angular motion beyond their intended rotations.

Thus, the motor shaft 64, the cam 66, the bearing 74, the pin 76, the flexure 42, and the spherical journal bearing 54 provide a kinematic link between the motor 62 and the coupler 24 to convert rotational motion of the motor 62 into bending motion within the coupler 24. Frictional engagements along the kinematic link are minimized. The free portion 46 of the flexure 42 is suspended on resilient arms 50 and 52 out of frictional engagement with the frame 12. The cam 66 and the free portion 46 of the flexure 42 engage each other with rolling contact through the bearing 74. Within the free portion 46 of the flexure 42, the spherical bearing 54 relieves any unwanted angular stress in the coupler 24 beyond the narrowed intermediate section 40.

The resilient arms 50 and 52 also function to generate a restorative force that preloads the kinematic chain, removing backlash or looseness that could produce disparate effects between opposite directions of cam rotation (e.g., hysteresis effects). The preload generated by the flexure 42 is transferred all the way back to the motor 62 to maintain all contacting surfaces of the kinematic chain in a constant state of engagement throughout the entire range of intended displacement.

The attenuating response of the preferred silica glass coupler 24 is non-linear. Little attenuation is apparent at small deflections, but at larger deflections, attenuation increases rapidly. To compensate for this non-linear response, the cam 66 is oriented so that the greatest rate of change in radius occurs through initial positions of rotation, and much slower rates of change in radius occur at subsequent positions of rotation corresponding to the larger deflections.

For example, the cam 66 can be made with a constant diameter but eccentrically mounted at an offset of, for example, 9 millimeters to produce a range of displacements of around 1 millimeter through 105–110 degrees of rotation. The rate displacement with cam rotation slows as the position of maximum displacement is approached.

Thermal and related stress compensation is also provided to provide consistent reliable performance through a range of ambient temperatures. Several systems of thermal compensation are involved.

One of the systems compensates for disparate thermal expansion characteristics between the fused silica coupler 24 and the frame 12. The silica coupler 24 and its adjoining pigtails 80 and 82 have a much lower coefficient of thermal expansion than the aluminum frame 12 in which they are mounted. To maintain a constant distance between the two pigtails 80 and 82 where they engage the frame 12 through the side walls 18, the pigtails 80 and 82 are joined to the side walls 18 through the thermal and stress compensating devices 20 and 22.

Figure 7:
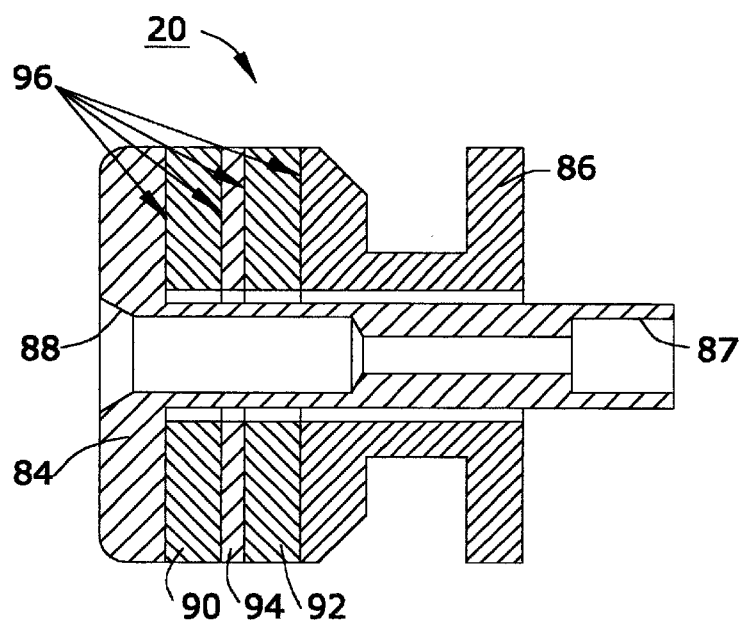
FIG. 7 is a cross-sectional view of a thermal and stress compensating device used to mount active components to the frame.

As shown in FIG. 7, the exemplary thermal and stress compensating device 20 is a bi-material laminate cylinder including a fiber coupler 84 that is axially moveable under the influence of temperature within a housing 86 that is attachable to the frame side walls 18. The input fiber 14 is adhesively bonded to one end 87 of the coupler 84, and the pigtail 80 of the coupler 24 is adhesively bonded to an opposite end 88 of the coupler 24.

Washers 90 and 92 made from materials having a low-elastic modulus (150–500 psi) and a high thermal expansion coefficient (150–300×10$^6$/° C.) are separated by a metal washer 94 and are adhesively bonded or vulcanized on interfacial surfaces 96 of the coupler 84, the housing 86, and the washers 94. With proper selection of material properties and dimensions of the washers 90, 92, and 94, the thermal and stress compensating devices 20 and 22 can significantly reduce thermal strain between the coupler 24 and the frame 12 caused by a mismatch of materials as well as the strain caused by offsetting the coupler 24 during use.

Another system of thermal compensation manages stress between the second section 32 of the coupler 24 and its mounting sleeve 36. The sleeve 36, which includes a contacting surface in the form of spherical bearing 54, is preferably made of a rigid wear-resistant material such as aluminum. A low-stress mounting for the coupler 24 within the sleeve 36 is provided by forming the bushing 38 with a silicone rubber or other material with similar characteristics that matches dimensional changes of the sleeve 36 accompanying changes in temperature to maintain a constant diameter fit with the second section 32 of the coupler 24.

A further system of thermal compensation compensates for thermal effects on the performance of the kinematic link between the motor 62 and the coupler 24. One requirement is that the overall thermal characteristics of the materials that link the motor 62 to the first section 26 of the coupler match the thermal characteristics of the materials in the kinematic chain that link the motor 62 to the second section 32 of the coupler. Otherwise, a change in temperature could produce an unwanted deflection between the fixed and free portions 44 and 46 of the flexure 42, thereby changing operating characteristics of the coupler 24. Forming both of the links with similar materials (e.g., aluminum) reduces the influence of temperature for equidistant links.

However, the kinematic link is specifically designed to vary the distances between the two links as particularly shown in FIGS. 1 and 2. In the undeflected state of FIG. 1, a dimension 100 between the motor axis 68 and an axis 102 of the first section 26 of the coupler 24 exactly matches a dimension 104 between the motor axis 68 and an axis 106 of the second section 32 of the coupler 24. However, in the deflected state of FIG. 2, the dimension 104 exceeds the dimension 100. Even the same materials over different distances produce different amounts of expansion or contraction with changes in temperature.

Figure 6:
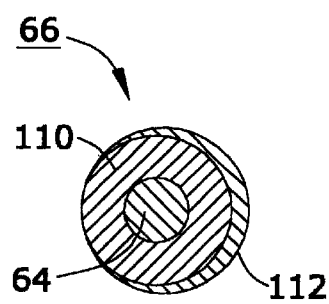
FIG. 6 is a cross-sectional view of a cam used to impart motion to the flexure.

In this embodiment, the change in dimension is directly attributable to the radial variation in the cam 66 around the axis 68. FIG. 6 shows a side view of the cam 66 modified in accordance with this invention to minimize thermal effects over the entire range of motion imparted by the cam 66. An inner ring 110 of the cam 66 is made of a first material, such as aluminum, having characteristics that provide appropriate thermal compensation for one deflection position (e.g., the undeflected state). An outer ring 112 of the cam 66 is made of a low thermal-expansion material such as Invar (an alloy of iron with approximately 36% nickel). The outer ring 112 varies little in dimension with temperature, so variations in the dimension 104 have little effect on the relative thermal dimensional stability of the fixed and kinematic links between the motor 62 and the two sections 26 and 32 of the coupler 24.

As a practical matter, it is preferable to make the cam 66 out of a single material—Invar. This could, however, disrupt the balance between the thermal characteristics of the fixed and kinematic links in the undeflected state of the variable optical attenuator 10. Two solutions are advanced. First, a similar low thermal-expansion material can be incorporated in the fixed link between the motor 62 and the first section 26 of the coupler 24 along a corresponding length of the dimension 100. Second, a high-thermal-expansion material can be incorporated in the kinematic link so that together, the high and low thermal-expansion materials exhibit a desired average thermal response.

Thus, balanced material selections can be used to produce the desired thermal compensation in the undeflected state of the variable optical attenuator 10, and a low thermal-expansion material can be used for maintaining the desired thermal compensation throughout the remaining range of intended operation. The material selections can also be used to produce the desired thermal compensation at a particular deflection position, such as the fully deflected state where coupler response is most sensitive to deflection, and the low thermal-expansion material can be used to minimize disparate thermal effects at the positions of lesser amounts of deflection.

Relatively reducing the thermal expansion characteristics of the kinematic link adjusts the position of thermal compensation in the direction of the more deflected positions. For example, the bearing 74 could be made of a material, such as steel, having lower thermal-expansion characteristics than aluminum to provide desired thermal compensation in a deflected position. Even if the thermal effects accompanying the range of motion imparted by the cam are not minimized, achieving the desired thermal compensation at one of the more deflected positions can meet performance objectives set for some variable optical attenuators.

The optical attenuation of variable optical attenuators arranged in accordance with this invention, can act upon a single wavelength or across a band of wavelengths. The attenuation effects can also be used to shift light between fibers. The variable optical attenuators generally provide stand-alone functions but can also perform secondary functions in more complex devices.

Other prime movers can be used in place of the motor 62 including manual forms of actuation or adjustment. Proportional solenoids and piezoelectric or bimetallic devices are also options. Other linear motion transmitting components (other than cams) can also be used including a tapered nut and a screw drive. Any additions to the length of the kinematic length are preferably made by low thermal-expansion materials to maintain thermal compensation over the intended range of operation. Beyond the examples set forth here, numerous other variations will be apparent to those of skill in this art within the teaching of this invention and its scope as set forth in the appended claims.

I claim:

1. A variable optical attenuator comprising:
   a frame;
   a fiber optical coupler having a first fiber section, a second fiber section, and an intermediate fiber section interconnecting the first and second fiber sections;
   a flexure having a fixed portion mounted on the frame and a free portion suspended from a resilient portion out of frictional engagement with the frame;
   the first fiber section of the optical coupler being attached to the frame;
   the second fiber section of the optical coupler being supported for limited angular movement by the free portion of the flexure;
   a kinematic chain connecting a source of motion to the free portion of the flexure for displacing the free portion of the flexure with respect to the fixed portion of the flexure;
   the free portion of the flexure being displaceable with respect to the fixed portion of the flexure without substantially changing in angular orientation with respect to the frame;
   a bearing carried by the free portion of the flexure permitting angular movement of the second fiber section of the optical coupler with respect to the free portion of the flexure; and
   the intermediate section of the optical coupler being bendable in response to the displacement of the free portion of the flexure to adjust transmission characteristics of the optical coupler.

2. The attenuator of claim 1 in which the intermediate fiber section is tapered in diameter with respect to the first and second fiber sections of the optical coupler.

3. The attenuator of claim 2 in which the optical coupler is a fused coupler.

4. The attenuator of claim 1 in which the flexible portion of the flexure permits movement of the free portion of the flexure in a first plane of motion and resists movement of the free portion of the flexure in a second orthogonally related plane.

5. The attenuator of claim 4 in which the flexible portion of the flexure has two resilient arms supporting the free portion of the flexure.

6. The attenuator of claim 5 in which the two resilient arms extend substantially parallel and straddle the intermediate fiber section of the optical coupler.

7. The attenuator of claim 1 further comprising a first sleeve mounting the first fiber section of the optical coupler on the frame.

8. The attenuator of claim 7 further comprising a second sleeve mounting the second fiber section in the free portion of the flexure.

9. The attenuator of claim 8 in which the second sleeve includes the bearing that allows angular movement of the second fiber section of the optical coupler with respect to the free portion of the flexure.

10. The attenuator of claim 9 in which the bearing has a spherical surface.

11. The attenuator of claim 10 in which the bearing is received in a cylindrical surface formed in the free portion of the flexure to permit both the angular movement of the second fiber section and an axial movement of the second fiber section to accommodate changes in distance between the fixed and free sections of the flexure.

12. The attenuator of claim 1 in which displacement of the free portion of the flexure with respect to the fixed portion of the flexure preloads the kinematic chain.

13. The attenuator of claim 12 in which the preload is obtained from a resilience of the flexible portion of the flexure.

14. The attenuator of claim 1 in which the kinematic chain includes a cam having a dimension that varies as a function of position for displacing the free portion of the flexure with respect to the fixed portion of the flexure.

15. The attenuator of claim 14 in which the cam dimension is a radius that varies as a function of rotational position.

16. The attenuator of claim 15 in which the cam engages a bearing supported on the free portion of the flexure.

17. A device for variably attenuating an optical signal transmitted through the device comprising:
   a frame;
   a flexure exhibiting flexibility in a first orthogonal direction and rigidity in a second orthogonal direction;
   a fixed portion of the flexure being attached to the frame and a free portion of the flexure being suspended from a resilient portion of the flexure;
   a fiber optical coupler having first and second fiber sections joined together by an fiber intermediate section;

the first fiber section being attached to the frame;

the second fiber section being supported by the free portion of the flexure;

an actuator operatively engaged with the free portion of the flexure for displacing the free portion of the flexure with respect to the fixed portion of the flexure through a range of displacement positions in the first orthogonal direction; and the second fiber section of the coupler being displaceable together with the free portion of the flexure for bending the intermediate fiber section of the coupler and attenuating the optical signal as a continuous function of the amount of bending in the intermediate fiber section of the coupler.

18. The device of claim 17 in which the actuator includes a source of motion attached to the frame and a kinematic chain connecting the source of motion to the free portion of the flexure for displacing the free portion of the flexure with respect to the frame.

19. The device of claim 18 in which the free portion of the flexure is displaceable with respect to the frame without substantially changing in angular orientation with respect to the frame.

20. The device of claim 18 in which the first fiber section is spaced from the source of motion at a first distance that varies as a function of temperature, and the second fiber section is spaced from the source of motion at a second distance that varies as a function of both temperature and displacement.

21. The device of claim 20 in which the distances between the first and second fiber sections and the source of motion vary at substantially the same rates as a function of temperature at one of the displacement positions.

22. The device of claim 21 in which attenuation varies nonlinearly with the displacement position through a first zone in which the attenuation is gradual and through a second zone in which the attenuation is more abrupt.

23. The device of claim 22 in which the one displacement position at which the distances between the first and second fiber sections and the source of motion vary at substantially the same rates as a function of temperature is within the second zone.

24. The device of claim 18 in which displacement of the free portion of the flexure generates reaction force that preloads the kinematic chain to the source of motion.

25. The device of claim 24 in which the kinematic chain includes a cam and the free portion of the flexure includes a follower that converts rotational motion of the cam into displacement of the free portion of the flexure.

26. The device of claim 25 in which the follower is a bearing that rotates together with the cam.

27. The device of claim 17 in which the resilient portion of the flexure includes a pair of beams interconnecting the fixed and free portions of the flexure.

28. The device of claim 27 in which the beams straddle the intermediate section of the coupler.

29. The device of claim 17 in which the free portion of the coupler envelops at least one half of a periphery of the second fiber section of the coupler.

30. The device of claim 29 in which the frame envelops a remaining portion of the second fiber section periphery to limit movement of the second fiber section in the second orthogonal direction.

31. A thermally compensated device for variably attenuating optical signals transmitted through the device comprising:

a frame;

an optical attenuator having first and second relatively displaceable sections for attenuating the optical signals as a function of relative displacement;

the first section of the attenuator being attached to the frame;

the second section of the attenuator being supported for movement with respect to the frame;

a source of motion attached to the frame;

a kinematic chain connecting the source of motion to the second section of the attenuator for displacing the second section with respect to the first section of the attenuator through a range of relative displacement positions;

the first section of the attenuator being spaced from the source of motion through a first distance that varies as a function of temperature;

the second section of the attenuator being spaced from the source of motion through a second distance that varies as a function of both temperature and the relative displacement;

portions of the second distance contributed by the relative displacement not significantly varying as a function of temperature; and throughout the range of displacement positions, the distances between the first and second sections of the attenuator and the source of motion varying by substantially the same amounts as a function of temperature so that the relative displacement positions remain substantially independent of temperature.

32. The device of claim 31 in which the kinematic chain includes among a series of components a cam having a dimension that varies as a function of position.

33. The device of claim 32 in which a first portion of the cam that includes the variation in dimension is made of a material having a lower coefficient of thermal expansion than other of the components of the kinematic chain.

34. The device of claim 33 in which the frame and the other components of the kinematic chain exhibit similar thermal expansion characteristics.

35. The device of claim 33 in which a second portion of the cam is also made of the material having a lower coefficient of thermal expansion than the other components of the kinematic chain.

36. The device of claim 35 in which another component of the kinematic chain has a higher coefficient of thermal expansion than the other components of the kinematic chain to offset the lower coefficient of thermal expansion of the second portion of the cam.

37. The device of claim 35 in which a connection between the first section of the attenuator and the source of motion through the first distance includes a portion having a lower coefficient of thermal expansion than other portions of the connection to offset the lower coefficient of thermal expansion of the second portion of the cam so that the first and second distances vary similarly with temperature.

38. The device of claim 31 in which the optical attenuator is a fiber coupler, the first section of the attenuator corresponding to a first end of the coupler and the second section of the attenuator corresponding to a second end of the coupler.

39. The device of claim 38 in which an intermediate section of the coupler is a fiber that interconnects the first and second ends of the coupler.

40. The device of claim 39 in which displacement of the second end of the coupler with respect to the first end of the coupler bends the intermediate section of the coupler for progressively attenuating the optical signals.

41. The device of claim 31 further comprising a flexure having a fixed portion mounted on the frame and a free portion suspended from a resilient portion out of frictional engagement with the frame.

42. The device of claim 41 in which the first section of the attenuator is attached to the frame, the second section of the attenuator is supported for limited angular movement by the free portion of the flexure, and the kinematic chain connects the source of motion to the free portion of the flexure for displacing the free portion of the flexure with respect to the fixed portion of the flexure.

43. The device of claim 42 in which the free portion of the flexure is displaceable with respect to the fixed portion of the flexure without substantially changing in angular orientation with respect to the frame.

44. The device of claim 43 further comprising a bearing within the free portion of the flexure that permits angular movement of the second section of the attenuator with respect to the free portion of the flexure.

45. A thermally compensated device for variably attenuating an optical signal transmitted through the device comprising:

a frame;

an optical coupler having a first fiber section, a second fiber section, and an intermediate fiber section interconnecting the first and second fiber sections;

the first fiber section being attached to the frame;

the second fiber section being supported for movement with respect to the frame;

a source of motion attached to the frame;

a kinematic chain connecting the source of motion to the second fiber section;

the kinematic chain including among a series of components a cam having a dimension that varies as a function of position section for displacing the second fiber section with respect to the first fiber section through a range of displacement positions; and a portion of the cam embodying the variation in dimension being made of a material having a lower coefficient of thermal expansion than other of the components of the kinematic chain.

46. The device of claim 45 in which a continuous physical connection between the first fiber section and the source of motion varies in length as a function of temperature and the kinematic chain between the second fiber section and the source of motion varies in length as a function of both temperature and displacement.

47. The device of claim 46 in which the cam includes a base portion that does not vary in the same dimension and that is also made of the material having the lower coefficient of thermal expansion.

48. The device of claim 47 in which the continuous physical connection includes a portion having a lower coefficient of thermal expansion to compensate for the lower coefficient of thermal expansion of the base portion of the cam so that the lengths of the continuous physical connection and the kinematic chain measured in the direction of the displacement vary by approximately equal amounts as a function of temperature.

49. The device of claim 47 in which a portion of the kinematic chain includes a higher coefficient of thermal expansion to offset the lower coefficient of thermal expansion of the base portion so that the lengths of the continuous physical connection and the kinematic chain measured in the direction of the displacement vary by approximately equal amounts as a function of temperature.

50. The device of claim 45 in which the cam varies in a radial dimension of as a result of rotation around an axis.

51. The device of claim 50 in which the variation in radial dimension varies a length of the kinematic chain substantially independent of temperature.

52. The device of claim 45 further comprising a flexure having a fixed portion mounted on the frame and a free portion suspended from a resilient portion out of frictional engagement with the frame.

53. The device of claim 52 in which the resilient portion is displaceable for preloading the kinematic chain through the cam.

54. The device of claim 53 in which the second fiber section of the optical coupler is supported for limited angular movement by the free portion of the flexure.

55. The device of claim 54 in which the free portion of the flexure being displaceable with respect to the fixed portion of the flexure without substantially changing in angular orientation with respect to the frame.

56. The device of claim 54 further comprising a bearing carried by the free portion of the flexure permitting angular movement of the second fiber section of the optical coupler with respect to the free portion of the flexure.

* * * * *